March 1, 1966

N. D. TRBOVICH ETAL 3,238,398

TORQUE MOTOR

Filed Sept. 18, 1962

INVENTOR.
NICHOLAS D. TRBOVICH
& WILLIAM H. MEYER
BY
Christel & Bean
ATTORNEYS

United States Patent Office 3,238,398
Patented Mar. 1, 1966

3,238,398
TORQUE MOTOR
Nicholas D. Trbovich, West Seneca, and William H. Meyer, East Aurora, N.Y.; said Meyer assignor to Servotronics, Inc., Buffalo, N.Y.
Filed Sept. 18, 1962, Ser. No. 224,305
13 Claims. (Cl. 310—29)

This invention relates generally to electro-mechanical actuators, of the type known as torque motors, and more specifically to a new and useful torque motor construction particularly adapted for torque motors of the dry coil variety.

It is known to isolate the output of a torque motor from its magnetic circuit by means of a flexure tube. In one form, the armature is mounted on the upper end of the tube, and the tube bends as the armature rotates. The flapper extends through the tube, from its upper end. However, such constructions heretofore have concentrated the maximum stress of bending at the base of the tube, which significantly shortens the life of the tube and thereby decreases the reliability of the unit.

Accordingly, a primary object of our invention is to provide a flexure tube construction wherein the stress of bending is more nearly equalized throughout the tube length, and in which the tube is strengthened in the area of greatest stress concentration, thereby greatly increasing the reliability and performance of this type of unit.

In this aspect thereof, a torque motor of our invention is characterized by the provision of a flexure tube having a mounting base and supporting an armature connected to its outer end wherein the tube is of tapered wall form from its base toward its outer end.

If the armature is mechanically supported solely by the flexure tube, it is subject to undesired movement produced by shock and vibration. While it is known to restrain the armature in a manner eliminating such movement and rendering the tube and armature less sensitive to shock, such restraining means heretofore have caused the tube to assume an unnatural, compound curvature when bending, producing greater fatigue in the tube and requiring an increased deflection force on the armature for a given flapper movement.

Accordingly, another object of our invention is to provide an armature and supporting flexure tube assembly with restraining means rendering the assembly less shock and vibration sensitive, without distorting the tube and without increasing the deflection force required on the armature.

In this aspect thereof, a torque motor of our invention is characterized by the provision of a flexure tube mounting an armature for rotation about a transverse axis, together with torsion restraint means alined with the natural pivot point of the tube and constraining the armature to rotation thereabout.

Another problem presented by an arrangement of this general type arises from the spring rate of the flapper. The armature must move a finite distance just to overcome the displacement caused by the yielding or bending of the flapper under load, and this can result in overloading the flexure tube. When the flapper diameter is reduced throughout, for clearance within the tube, it produces a springier flapper requiring greater armature deflection, which is undesirable.

Accordingly, it also is an object of our invention to provide a more rigid flapper construction, and a flapper and flexure tube arrangement which eliminates the possibility of overstressing the flexure tube.

In these aspects thereof, a torque motor of our invention is characterized by the provision of a flapper mounted adjacent one end on a flexure tube and extending therethrough, the flapper tapering substantially from its mounting end to its output end; and by the provision of a flapper arranged to abut the flexure tube adjacent the mounting base thereof upon predetermined rotation of the armature, thereby providing a mechanical stop preventing further rotation of the armature and overstressing of the tube.

The foregoing and other objects, advantages and characterizing features of the torque motor of our invention will become clearly apparent from the ensuing detailed description of certain presently preferred, illustrative embodiments thereof, in conjunction with the accompanying drawings illustrating the same wherein like reference numerals denote like parts throughout the various views and wherein.

Figure 1:
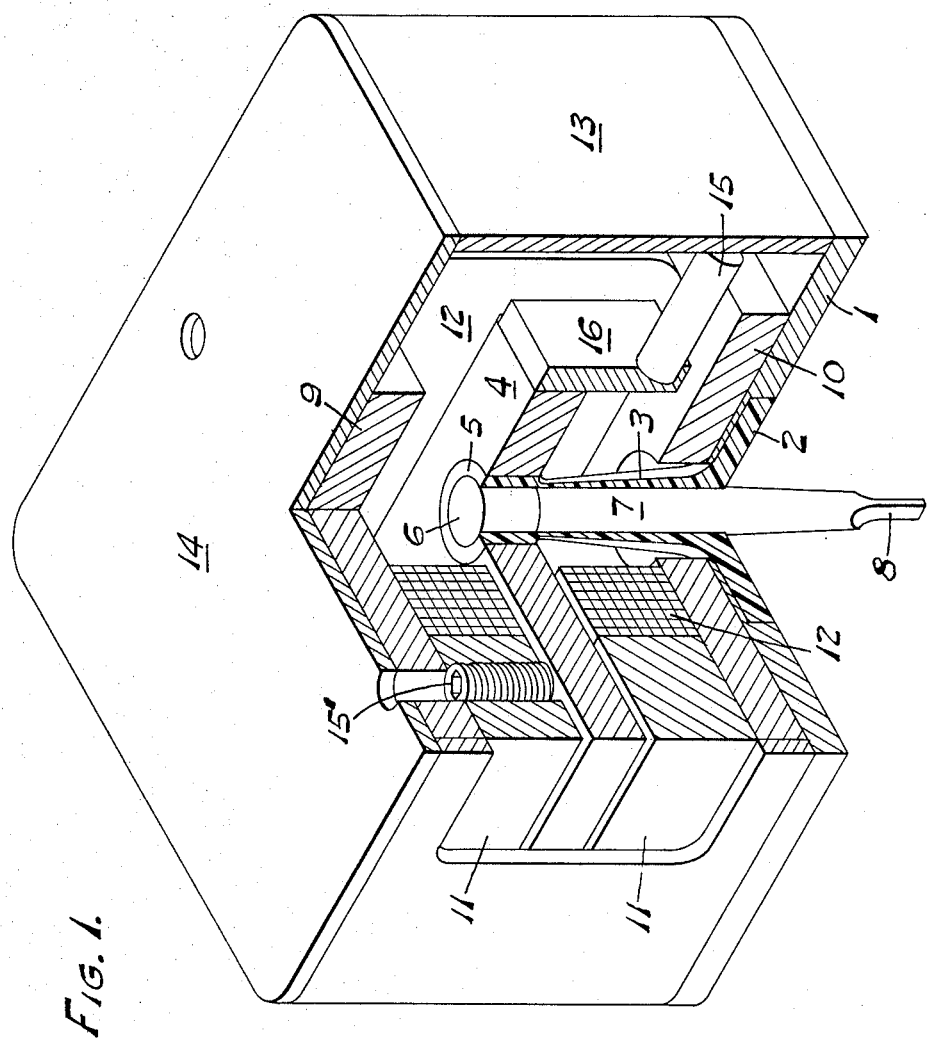
FIG. 1 is a top perspective view, with a quarter section cut away, of one form of torque motor of our invention.

Referring now in detail to the accompanying drawings, and initially to FIGS. 1–4 thereof, there is shown a torque motor of our invention which is provided with a mounting plate 1 having a central aperture annularly shouldered to receive the annular base 2 of a flexure tube 3. An armature 4 is secured to the upper end 5 of flexure tube 3, and the inner, mounting end 6 of a flapper 7 is secured in the upper end 5 of the flexure tube. Flapper 7 extends through tube 3, and terminates at its outer end in an output end 8.

The magnetic circuit can be of a known type, comprising for example top and bottom shunts 9 and 10, respectively, extending between paired pole pieces 11 at opposite ends of armature 4, only the lefthand pair being visible in FIG. 1. Permanent magnets (not shown) are provided on each side of each pair of pole pieces 11, together with two control coils 12 for varying the relative flux acting on the opposite ends of armature 4. Such magnetic circuits and their operation are known (see, for example, the article "Small Displacement Electromechanical Actuators," by Nicholas D. Trbovich, appearing in Military Systems Design for January-February 1960, published by Instruments Publishing Company, Pittsburgh 12, Penna.), and require no further description here. The entire assembly is contained within a frame 13, which can be closed by a top plate 14, and adjustable stops 15' can be provided adjacent each end of the armature 14, for limiting rotation of the armature.

In accordance with our invention, flexure tube 3 is of tapered wall form, from its base 2 to its end 5. That is to say, the wall of tube 3, between base 2 and end 5, attenuates from the former to the latter, being of progressively decreasing thickness or section from base 2 to end 5. This is in sharp contrast with the constant thickness, cylindrical wall form of standard flexure tubes.

We have discovered that such attenuation, or tapering of the flexure tube wall distributes bending stresses more uniformly along the length of the flexure tube, thereby reducing the usual concentration of bending stress at the juncture with base 2. It also permits an increased wall section or thickness at the juncture with the base 2, to better withstand such stress concentration, without correspondingly increasing the rigidity of the tube. Thus, it is seen that the provision of a tapered wall form in the flexure tube attacks the problem of stress both by more uniformly distributing the stress along the tube, and by providing the greatest wall thickness at the area of greatest stress concentration. The result is a flexure tube of significantly longer life and greater reliability.

Figure 2:
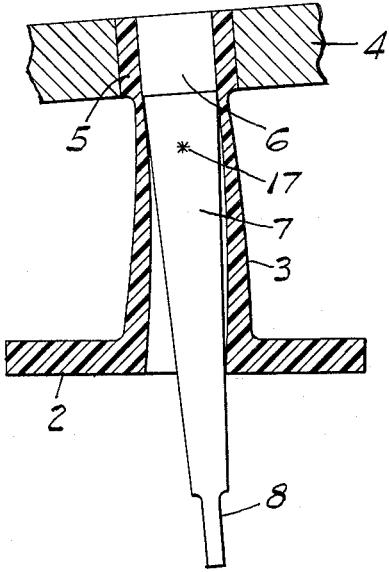
FIG. 2 is a fragmentary sectional view, on an enlarged scale, depicting the operation of the flexure tube and flapper.
Figure 3:
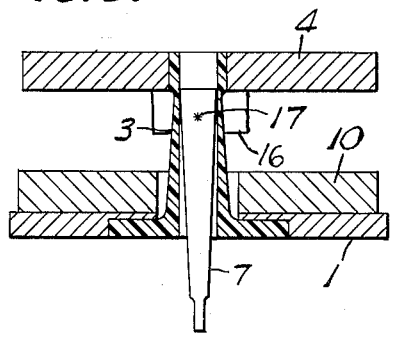
FIG. 3 is a vertical sectional view, corresponding to that of FIG. 2 but on a reduced scale and with the flexure tube and flapper in neutral position.
Figure 4:
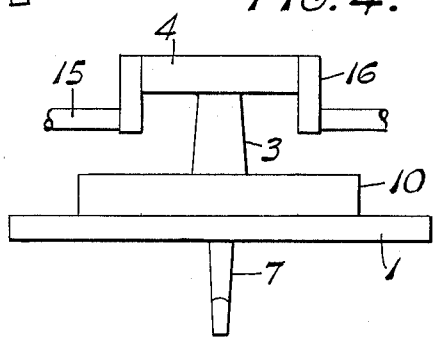
FIG. 4 is a side elevational view thereof, taken at a right angle to FIG. 3.

The flexure tube has a calculable point about which it tends to bend as it flexes upon rotation of the armature. In a standard, cylindrical flexure tube this point will be close to the base, for example approximately one-fourth the length of the tube away from the base. With our tapered wall construction, this point is shifted to a position approximately two-thirds the way along the length of the tube, from the base, as indicated at 17 (FIG. 2).

If unrestrained, the tube will bend about this point in the manner of a cantilever beam with a load at its extremities, assuming a simple curved form. Unless restrained, however, this point will float, and the armature will shift in response to shock and vibration forces. When this is not desired, the armature and flexure tube must be restrained against such shifting movement. Therefore, where restraint is required, or desired, the problem is to provide the requisite restraint without interfering with the desired armature movement and without imposing additional stress forces on the tube.

If the armature of FIG. 1, for example, is restrained by means lying in the plane of the armature, it will be constrained to rotate or oscillate about an axis centrally through the end 5 of tube 3. Because end 5 is spaced from the natural bending point 17 of tube 3, this will force the tube to assume a compound curvature, instead of a simple, curved form. This places the tube under both compression and tension, causing greater fatigue in the tube and requiring greater deflecting force on the armature, for a given flapper movement.

We avoid this undesirable result in the torque motor of our invention, by restraining the armature in line with the natural pivot point 17 of the flexure tube. Referring to FIGS. 1–4, for example, the necessary restraint is provided by means in the form of paired torsion members 15, which are connected at one end to the opposite sides of armature 4 by connecting members 16. Member 15 are fixed at their opposite ends to frame 13. Torsion bars 15 are alined with each other, and with the natural pivot point 17 whereby as the armature rotates, it is constrained to do so about an axis through point 17. This permits the flexure tube to assume the simple curved form which it would assume if unrestrained, while effectively restraining the armature against shock and vibration induced movement.

Figure 5:
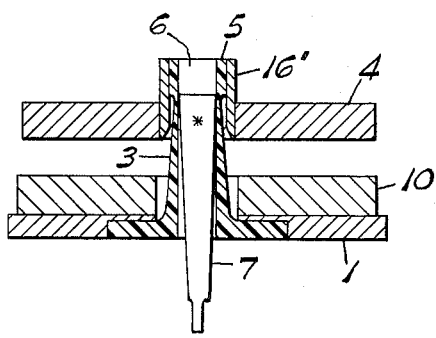
FIG. 5 is a vertical sectional view, like that of FIG. 3 but showing a modified armature mounting arrangement.
Figure 6:
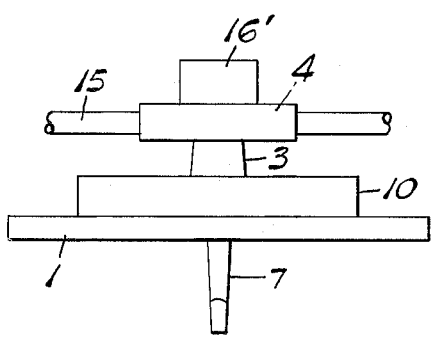
FIG. 6 is a side elevational view thereof, taken at a right angle to FIG. 5.

Instead of mounting the armature at the outer end of tube 3, and inwardly offsetting the restraining means, the alternate construction of FIGS. 5 and 6 can be used. Here, the armature 4 itself is downwardly or inwardly offset, from the upper end 5, and located in a plane extending through point 17. The torsion bars 15 then extend in the plane of the armature, which is connected to the upper or outer end 5 of torque tube 3 by the circular connecting member 16'. As in the embodiment of FIGS. 1–4, this causes the armature to rotate about an axis through the natural pivot or bending point 17 of the flexure tube, thereby avoiding undesirable compound curving of the tube.

The embodiment of FIGS. 5 and 6 has the added advantage that the flexure tube can be extended through and beyond the armature, instead of stopping at the armature as is conventional. Thus, the flexure tube now can be extended well beyond the midpoint of the motor, permitting a flexure tube of greater length resulting in even further reduction of the fatigue factor.

The tapered flexure tube is particularly advantageous, where it is desired to restrain the armature in line with the natural pivot point of the flexure tube, because it shifts this point upwardly from the base, as previously noted, this makes it more convenient to restrain the armature in line with this point, in a given space.

The tapered flexure tube, by shifting the pivot point 17 away from the base 2, also gives a longer effective moment arm for the same flapper length. This results in a greater displacement of the flapper output end 8 for a given armature displacement, which is desirable.

It is another feature of our invention that the flapper is tapered, from its inner end 6 to its output end 8. Thus, adjacent its inner end 6, where little or no clearance is required, the flapper has a diameter closely approximating the inner diameter of tube 3. The outward tapering of the flapper provides the progressively greater clearance with the tube required for bending. It also provides a flapper of greatly increased rigidity, as contrasted with a flapper of uniform diameter which of necessity would be the reduced diameter required adjacent base 3. This produces a flapper of higher spring rate, requiring less deflection of the armature to compensate for a load on the flapper, and making for a smaller and more efficient motor.

In addition, we arrange the flapper so that it abuts the base 2 of flexure tube 3 upon predetermined rotation of armature 4. Tube 3 thereupon provides a mechanical stop against further rotation of armature 4 and bending of tube 3, thereby avoiding overstressing of the tube.

Where torsional restraints are used, the force required for armature deflection can be varied by varying the spring rate of members 15, the tube remaining the same. However, tube 3 can provide all the necessary springiness, and members 15 need have no springiness whatever.

Accordingly, it is seen that our invention fully accomplishes its intended objects. While we have shown and described in detail only two embodiments of our invention, that has been done by way of illustration only. We are aware that variations and modifications will occur to those skilled in the art, and intend to include the same within the scope of the appended claims.

Having fully disclosed and completely described our invention, and its mode of operation, what we claim as new is:

1. A torque motor comprising, a flexure tube supported adjacent one end thereof, and an armature mounted on said flexure tube adjacent the opposite end thereof for oscillatory movement about an axis transverse to said tube, wherein said tube is of tapered wall form substantially from said one end to said other end thereof, together with restraining means alined with the natural pivot point of said flexure tube and constraining said armature to oscillation about an axis through said point.

2. A torque motor as set forth in claim 1, wherein said armature is alined with said pivot point, said flexure tube extending beyond said armature and said armature being connected to said tube adjacent said other end thereof.

3. A torque motor as set forth in claim 1, wherein said armature is positioned at said opposite end of said tube in spaced relation to said pivot point.

4. A torque motor comprising, a flexure tube supported adjacent one end, an armature mounted on said tube for oscillation about an axis transverse thereto, and restraining means alined with the natural pivot point of said flexure tube and constraining said armature to oscillate about an axis through said point.

5. A torque motor as set forth in claim 4, wherein said armature is alined with said point, said tube extending beyond said armature and said armature being connected to the opposite end of said tube.

6. A torque motor as set forth in claim 4, wherein said armature is positioned at the opposite end of said tube in spaced relation to said point.

7. A torque motor as set forth in claim 4, wherein said restraining means comprise torsional restraints.

8. A torque motor comprising, a flexure tube supported adjacent one end thereof, said flexure tube being of tapered wall form substantially from said one end to the opposite end thereof, an armature mounted on said tube for oscillatory movement about a transverse axis, said armature being connected to said opposite end of said tube, said tube having a natural pivot point about which it tends to bend upon oscillatory movement of said armature, means restraining said armature against movement other than oscillation about an axis through said natural pivot point of said tube, and a flapper connected adjacent one end to said tube adjacent said opposite end thereof, said flapper extending through said tube and tapering from said one end of said flapper toward the opposite end thereof.

9. A torque motor as set forth in claim 8, wherein said armature is in a plane through said point and said flexure tube extends beyond said armature.

10. A torque motor as set forth in claim 8, wherein said armature is positioned at said opposite end of said tube in spaced relation to said point.

11. A torque motor as set forth in claim 8, wherein said flapper abuts said tube adjacent said one end thereof upon predetermined movement of said armature in either direction about said axis, said flapper thereafter comprising a stop against further movement of said armature in the same direction.

12. A torque motor as set forth in claim 8, wherein said restraining means comprise torsional restraints.

13. A torque motor comprising, a flexure tube of annular transverse section supported adjacent one end thereof, said flexure tube being of progressively tapered wall form substantially from said one end to the opposite end thereof, an armature mounted on said tube for oscillatory movement about a transverse axis through the pivot point thereof, said armature being connected to said tube adjacent said opposite end thereof, torsional restraining means alined with said pivot axis and constraining said armature to oscillation thereabout, and a flapper connected adjacent one end to said tube adjacent said opposite end thereof, said flapper being of a diameter closely approaching that of said tube at said one end of said flapper and progressively tapering from said one end of said flapper substantially to the opposite end thereof, said flapper extending through said tube and abutting said tube adjacent said one end thereof upon predetermined oscillation of said armature in either direction about said axis, said tube thereupon comprising a stop against further movement of said armature in that direction.

References Cited by the Examiner
UNITED STATES PATENTS
2,962,611   11/1960   Atchley _____ 310—38 X MILTON O. HIRSHFIELD, *Primary Examiner.*

O. L. RADER, *Examiner.*

J. W. GIBBS, *Assistant Examiner.*